United States Patent Office 2,909,543
Patented Oct. 20, 1959

2,909,543
COMPLEXES OF SULFONIUM COMPOUNDS

William E. Weesner, Dayton, Ohio, assignor to Monsanto Chemical Company, St. Louis, Mo., a corporation of Delaware No Drawing. Application May 18, 1956
Serial No. 585,610

7 Claims. (Cl. 260—433)

The present invention relates to complexes of sulfonium compounds and more particularly provides new complexes of haloaryl sulfonium halides and certain metal halides, methods of producing the same, and biological toxicants comprising the said complexes.

According to the invention there are provided complexes of (I) a (haloaryl)dialkylsulfonium iodide of the formula

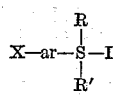

in which X denotes halogen, ar denotes an aryl radical of from 6 to 12 carbon atoms and R and R' denote an alkyl radical of from 1 to 8 carbon atoms and (II) a halide of a metal of the IB and IIB groups of the periodic table.

The present complexes are prepared by contacting either an appropriate (haloaryl)dialkylsulfonium iodide or an appropriate (haloaryl)dialkylsulfonium triiodide with an appropriate metal halide. Irrespective of whether the monoiodide or the triiodide is used, the end complex is an adduct of one mole of the metal halide with one mole of the (haloaryl)dialkylsulfonium mono-iodide.

(Haloaryl)dialkylsulfonium iodides or triiodides having the above formula and useful for the preparation of the present complexes include, e.g., the chlorophenyldialkylsulfonium iodides or triiodides such as (2-chlorophenyl)dimethylsulfonium triiodide, (4-bromophenyl)diethylsulfonium iodide, (3-iodophenyl)di-n-butylsulfonium triiodide, (chlorophenyl)amylpropylsulfonium iodide, (3-chlorophenyl)bis(2-ethylhexyl)sulfonium triiodide; the halonaphthyldialkylsulfonium iodides or triiodides such as 1-(2-chloronaphthyl)diethylsulfonium triiodide, 1-(2-bromonaphthyl)-di-n-hexylsulfonium iodide or 2-(1-iodonaphthyl)amylbutylsulfonium triiodide; the (halobiphenylyl)dialkylsulfonium iodides or triiodides such as 4-(4'-iodobiphenylyl)diethylsulfonium iodide or 4-(2-chlorobiphenylyl)di-n-butylsulfonium triiodide; the (ar-haloalkaryl)-dialkylsulfonium iodides or triiodides such as 4-(2-chlorotolyl)-dimethylsulfonium triiodide or 2-(4-iodoisopropylphenyl)di-n-octylsulfonium iodide, etc.

The metal halides with which the (haloaryl)dialkylsulfonium iodides or triiodides are reacted to give the present complexes, are e.g., mercuric chloride, bromide or iodide; cupric chloride, bromide or iodide; zinc chloride, bromide or iodide; gold chloride, bromide or iodide; silver chloride, bromide or iodide; and cadmium chloride, bromide or iodide.

When using the mono-iodide the reaction is one of simple addition, e.g., with (4-chlorophenyl)dimethylsulfonium iodide and cupric chloride it takes place substantially as follows:

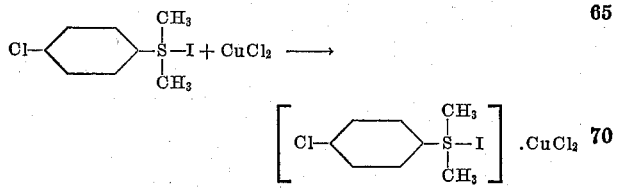

When employing the sulfonium triiodide, one mole of iodine is liberated substantially as follows:

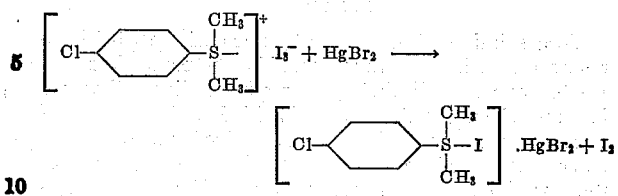

The (haloaryl)dialkylsulfonium mono-iodides are readily obtainable by reacting a bis(haloaryl)disulfide with the appropriate alkyl iodide whereby cleavage of the disulfide results with addition of the alkyl iodide to the cleaved fragment. As disclosed in my copending application Serial No. 585,611, filed of even date, the presently useful triiodides are obtained under the proper conditions by condensation of a bis(haloaryl)disulfide with an alkyl iodide substantially according to the scheme:

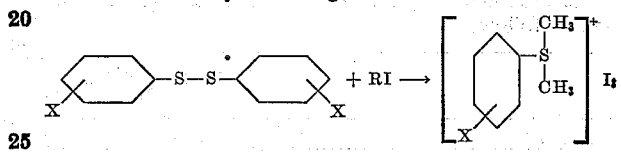

Reaction of the sulfonium iodide or triiodide with the metal halide to give the complexes occurs very readily, sometimes with evolution of heat. The (haloaryl)dialkylsulfonium iodides are generally mixed with a diluent or solvent which is inert during the reaction conditions and the metal halide is introduced into the mixture. It is usually advisable to use as a reaction medium a diluent which is a solvent for the sulfonium iodide. If the diluent is also a solvent for the complex the product is isolated from the reaction mixture by adding to it a liquid which is a non-solvent therefor. Thus, in some instances, a solvent such as acetone or methyl ethyl ketone is generally mixed with the (4-haloaryl)dialkylsulfonium iodide or triiodide, the metal halide is added to the mixture and the reaction product, i.e., the (haloaryl)dialkylsulfonium iodide-metal halide complex, is precipitated from the reaction mixture by adding to it a non-solvent such as ether. As the carbon content of the aryl and/or the alkyl radicals of the sulfonium iodides increases, the reactivity of the iodides in complex formation may decrease; hence, with some of the sulfonium iodides it may be beneficial to employ external heat in order to complete the addition reaction. Since formation of the present complexes proceeds with addition of one mole of the sulfonium iodide or triiodide with one mole of the metal halide these reactants are advantageously employed in stoichiometric proportions; however, an excess of either reactant may be employed and subsequently recovered from the reaction product. The sulfonium iodide-metal halide complex is generally easily isolated from the reaction mixture by extraction, crystallization, etc.

The present complexes are stable compounds which range from viscous liquids to crystalline or glassy solids. They are soluble in ketone solvents such as acetone, methyl ethyl ketone, etc. and generally insoluble in ethers such as ethyl ether, etc. While they may be advantageously employed for a variety of commercial and industrial purposes they are most useful as biological toxicants. The present complexes are particularly effective bacteriostats, being active against some organisms at a concentration of one part of complex per million parts of carrier. They are also effective against fungi and nematodes. The present complexes may be applied against microorganisms or on plants in admixture with dust or liquid carriers. Thus they may be employed with talc, bentonite or other inert powders or dusts in concentrations of, say, from 0.0001% to 1.0%; or they may be employed in aqueous suspensions, oil-in-water emulsions or organic solutions in like concentrations.

The invention is further illustrated but not limited by the following examples:

Example 1

To a solution of 5.5 g. (0.01 mole) of the (4-chlorophenyl)-dimethylsulfonium triiodide (prepared from bis (4-chlorophenyl)-disulfide and methyl iodide) dissolved in 9 ml. of acetone there was added 3.6 g. (0.01 mole) of mercuric bromide. When all had dissolved, 20 ml. of ether was added to the reaction mixture. There was thus precipitated the crude, yellow solid mercuric bromide complex of (4-chlorophenyl)dimethylsulfonium iodide. Filtration gave 5.0 g. of the solid and another 1.0 g. was obtained from the mother liquors. The 6.0 g. of crude product was purified by dissolving it in 40 ml. of acetone at room temperature, precipitating it with 75 ml. of ether, filtering and washing the solid with ether. There was thus obtained 5.4 g. of the white, substantially pure (4-chlorophenyl)dimethylsulfonium iodide-mercuric bromide complex, M.P. 120–121° C., and analyzing as follows:

|  | Found | Calcd. for $C_8H_{10}Br_2ClHgS$ |
|---|---|---|
| Percent C | 14.95 | 14.53 |
| Percent H | 1.74 | 1.51 |
| Percent S | 4.69 | 4.84 |

Example 2

This example shows testing of the (4-chlorophenyl)-dimethylsulfonium iodide-mercuric bromide complex of Example 1 against *Micrococcus pyogenes* var. *aureus* and *Salmonella typhosa*. A 1% stock solution of the complex in a non-toxic solvent was added to nutrient agar to give respective test samples containing one part of the complex per 1,000 parts of the agar, one part of the complex per 10,000 parts of the agar, one part of the complex per 100,000 parts of the agar and one part of the complex per 1,000,000 parts of the agar. Petri dishes were respectively filled with each of the four test mixtures, and the plates thus prepared were then respectively inoculated with said *Micrococcus pyogenes* and said *Salmonella typhosa* organisms and incubated for 5 days at a temperature of 25° C. At the end of that time inspection of the plates showed complete inhibition of growth of both *Micrococcus pyogenes* and the *Salmonella typhosa* by each of the four test samples, whereas "blank" inoculated nutrient agar plates showed profuse growth.

Example 3

The (4-chlorophenyl)dimethylsulfonium iodide-mercuric bromide complex of Example 1 was tested against the fungus *Aspergillus niger* employing the following testing procedure: a 1% stock solution of said complex in a non-toxic solvent was made up and this solution was respectively added to containers of sterile, melted dextrose agar in quantities to give one part of complex per 1,000 parts of agar and one part of complex per 10,000 parts of agar. After thorough mixing the respective agar mixtures were poured into Petri dishes and allowed to harden. One drop of a spore suspension of the fungus served as inoculum for each dish. The inoculated dishes were incubated at a temperature of 25° C. for 5 days. At the end of that time inspection of the dishes showed complete inhibition of the growth of the test fungus at each of the test concentrations, whereas "blank" test specimens, i.e., agar containing none of the complex but similarly inoculated and incubated, showed extensive fungus growth.

What I claim is:

1. A complex of (1) a (haloaryl)dialkylsulfonium iodide of the formula

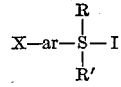

in which X selected from the class consisting of chlorine, bromine and iodine, ar denotes an aryl radical of from 6 to 12 carbon atoms and R and R' denote an alkyl radical of from 1 to 8 carbon atoms and (2) a halide which is selected from the class consisting of the chloride, bromide and iodide of a metal of the 1–B and 2–B groups of the periodic table.

2. A complex of mercuric bromide and a (chloroaryl) dialkylsulfonium iodide having from 6 to 12 carbon atoms in the aryl radical and from 1 to 8 carbon atoms in each alkyl radical.

3. A complex of mercuric bromide and (chlorophenyl) dialkylsulfonium iodide having from 1 to 8 carbon atoms in the alkyl radical.

4. A complex of (4-chlorophenyl)dimethylsulfonium iodide and mercuric bromide.

5. The method which comprises contacting a halide which is selected from the class consisting of the chloride, bromide and iodide of a metal of the 1–B and 2–B groups of the periodic table with a sulfonium iodide selected from the class consisting of a (haloaryl)dialkylsulfonium mono-iodide wherein the halo substituent is selected from the class consisting of chlorine, bromine and iodine, the aryl radical has from 6 to 12 carbon atoms and the alkyl radical from 1 to 8 carbon atoms and a (haloaryl) dialkylsulfonium triiodide in which the aryl and alkyl radicals and the halo substituent are as herein defined, and recovering from the resulting reaction product the complex defined in claim 1.

6. The method which comprises contacting a (chloroaryl)dialkylsulfonium triiodide having from 6 to 12 carbon atoms in the aryl radical and from 1 to 8 carbon atoms in the alkyl radical with a halide which is selected from the class consisting of the chloride, bromide and iodide of a metal of the 1–B and 2–B groups of the periodic table and recovering from the resulting reaction product a complex of one mole of said metal halide with one mole of a (chloroaryl)dialkylsulfonium iodide in which the aryl radical has from 6 to 12 carbon atoms and the alkyl radical has from 1 to 8 carbon atoms.

7. The method which comprises contacting mercuric bromide with (4-chlorophenyl)dimethylsulfonium triiodide and recovering from the resulting reaction product a complex in which one mole of the mercuric bromide is combined with one mole of (4-chlorophenyl)dimethylsulfonium iodide.

References Cited in the file of this patent

UNITED STATES PATENTS

| 2,069,165 | Kharasch | Jan. 26, 1937 |
| 2,411,815 | Sowa | Nov. 26, 1946 |
| 2,471,622 | Hartmann et al. | May 31, 1949 |
| 2,754,241 | Schwerdle | July 10, 1956 |